Aug. 10, 1948.  H. STOLZ  2,446,963
AXIALLY SHIFTING TYPE SCREW SHAFT
ACTUATED TIRE REMOVING DEVICE
Filed Feb. 8, 1945

Inventor
Henry Stolz
by his Attorneys
Howson & Howson

Patented Aug. 10, 1948

2,446,963

UNITED STATES PATENT OFFICE 2,446,963

AXIALLY SHIFTING TYPE SCREW SHAFT ACTUATED TIRE REMOVING DEVICE

Henry Stolz, Bound Brook, N. J.

Application February 8, 1945, Serial No. 576,759

1 Claim. (Cl. 157—6)

This invention relates to a tire-removing apparatus and more particularly to an apparatus for removing heavy tires from their rims.

Such tires usually employed on trucks are often in position through long periods and are subjected to severe conditions with the result that dirt and rust bond the tire and rim to an extent such that their removal by any ordinary apparatus is a tedious job. When force is applied to the arched side wall of the tire, the tendency is to force the bead of the tire more firmly into engagement with the rim and thus increase the difficulties of removal.

An important object of the present invention is the production of a relatively simple and easily producible apparatus for removing such tires, wherein the structure is such that the pressure throughout the tire removing operation is applied to the tire at the bead thereof and in close proximity to the rim surface.

A still further object of the invention is to provide a novel and improved means for forcing tire engaging members utilized in applying pressure to the tire inwardly beneath the stationary flange of the rim and thereafter locking these elements in that position.

These and other objects I attain by the constructions shown in the accompanying drawings wherein.

Figure 1:
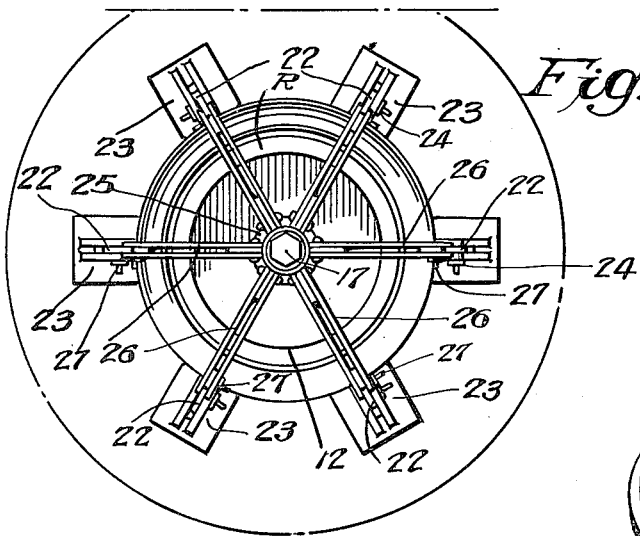
Fig. 1 is a plan view of a tire removing apparatus constructed in accordance with my invention.
Figure 4:
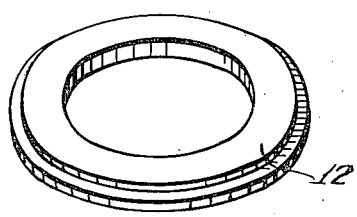
Fig. 4 is a perspective view of one of the adapter rings employed.

Referring now more particularly to the drawings, the numeral 10 designates an annular base which may be suitably secured to any desired supporting structure. The upper end of this base is shouldered at 11 to interchangeably receive adapter rings 12 by means of which various sizes of tire rims R may be fitted upon the base. The base has an axial threaded opening 13 receiving the threaded lower end of a jack screw 14. This jack screw has its upper end likewise threaded as at 15 for a considerable distance and upon this threaded portion there is mounted a lever nut 16, the purpose of which will presently appear. The upper extremity of the jack screw is squared or otherwise adapted as at 17 for the reception of a wrench whereby the screw may be rotated.

Secured to the central unthreaded portion of the jack screw are a pressure ring 18 and a stop collar 19. Beneath the pressure ring 18 there is disposed a spider 20 to the outer ends of the arms 21 of which are pivoted levers 22, the lower ends of which bear downwardly and inwardly inclining tire irons 23, the pivotal connections 24 of these levers being adjustable longitudinally of the arms for a purpose presently to appear. Between the stop collar 19 and lever nut 16, there is arranged a slidable collar 25 to which there are pivoted radial links 26 corresponding to number and arrangement to the levers 22 and pivotally connected at their outer ends to the upper ends of these levers as at 27. As in the case of the pivotal connections 24, the pivotal connections 27 are adjustable longitudinally of the links 26.

Figure 2:
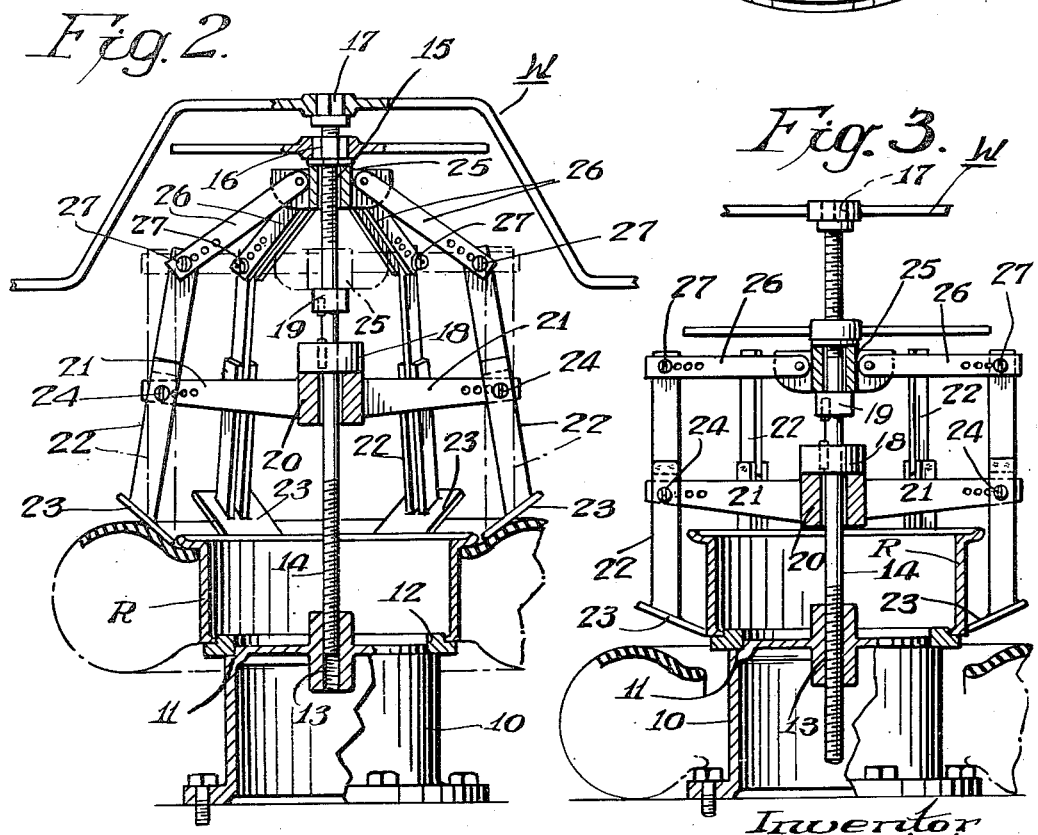
Fig. 2 is a vertical sectional view therethrough, the dotted lines illustrating the method of engaging the tire irons beneath the rim flange.
Figure 3:
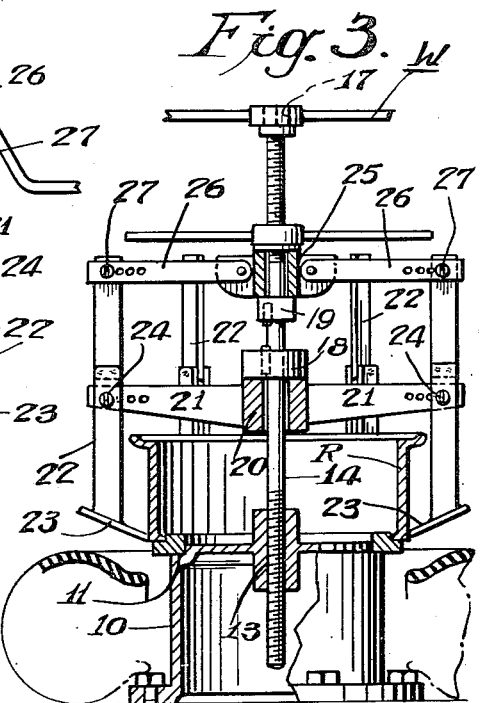
Fig. 3 is a fragmentary sectional view showing the completed removal of a tire.

In use of the apparatus, an adapter ring 12 of the proper size is selected and placed upon the base 10 or in the case of the smaller size rim for which the apparatus is usable, the rim may be placed directly upon the seat otherwise receiving the adapter ring, the fixed flange of the rim R being arranged uppermost. The jack screw is placed in position, the pivotal connections 24 and 27 having been adjusted to their proper positions for use with the specific rim being serviced. At this time the parts will be in the position illustrated in solid lines in Fig. 2. A wrench W is then employed to rotate the jack screw, forcing it downwardly in the threaded opening 13 until the irons 23 are positioned to engage beneath the fixed flange of the rim. The lever nut 16 is then operated to force collar 25 downwardly thereby causing the tire irons to move inwardly, these movements being accompanied by occasional operation of the wrench W until the inner ends of the tire irons are situated on the rim surface beneath the flange. The proper adjustments of the pivots 24 and 27 having been made, the lower end of collar 25 will at this time abut the upper surface of stop collar 19 and the pivotal connections of the links 26 to the collar 25 will lie below a plane including the pivotal connections 27 thus providing a toggle lock insuring against recession of the tire irons from the outer rim surface. While this effect may be obtained by making adjustments on either the links or the spider arms alone, the illustrated arrangement is preferred for the reason that it enables disposition of the levers in a vertical position during the tire removal. Operation of the wrench W is then continued to force the entire structure downwardly and to force the tire from the rim.

Since the construction illustrated is obviously capable of considerable modification without departing from the spirit of my invention, I do not wish to be understood as limiting myself thereto except as hereinafter claimed.

I claim:

In tire removing apparatus for removing tires from solid rims having a fixed flange, means to support the rim at its unflanged edge, a jack screw axially threadedly engaging the support, a spider carried by said screw and within which the screw may rotate, a plurality of circumferentially spaced vertical levers pivoted to the spider and each provided at its lower end with a rigidly attached tire engaging iron, a thrust collar on said jack screw to engage said spider, means to simultaneously shift the levers about the pivots thereof to engage the irons with the rim beneath the flange thereof comprising a collar slidable on the jack screw, links pivotally connected to said levers and said collar, means to shift the collar longitudinally of the jack screw and means to rotate the jack screw.

HENRY STOLZ.

REFERENCES CITED

The following references are of record in the file of this patent:

UNITED STATES PATENTS

| Number | Name | Date |
|---|---|---|
| 1,564,496 | Staugaard | Dec. 8, 1925 |
| 1,724,813 | Weaver et al. | Aug. 13, 1929 |
| 1,972,030 | Oakley | Aug. 28, 1934 |
| 2,024,891 | Spuler et al. | Dec. 17, 1935 |
| 2,373,975 | Plumeau et al. | Apr. 17, 1945 |
| 2,375,956 | Smith et al. | May 15, 1945 |

FOREIGN PATENTS

| Number | Country | Date |
|---|---|---|
| 659,107 | Germany | Dec. 22, 1935 |